(12) United States Patent
Glanzer et al.

(10) Patent No.: US 7,146,230 B2
(45) Date of Patent: Dec. 5, 2006

(54) INTEGRATED FIELDBUS DATA SERVER ARCHITECTURE

(75) Inventors: David A. Glanzer, Georgetown, TX (US); Lee A. Neitzel, Austin, TX (US); Donald B. Goff, Austin, TX (US)

(73) Assignee: Fieldbus Foundation, Austin, TX (US)

( * ) Notice: Subject to any disclaimer, the term of this patent is extended or adjusted under 35 U.S.C. 154(b) by 876 days.

(21) Appl. No.: 10/226,282

(22) Filed: Aug. 23, 2002

(65) Prior Publication Data

US 2003/0004987 A1 Jan. 2, 2003

Related U.S. Application Data

(63) Continuation-in-part of application No. 10/160,094, filed on Jun. 4, 2002, now Pat. No. 6,594,530, which is a continuation of application No. 08/916,178, filed on Aug. 21, 1997, now Pat. No. 6,424,872, application No. 10/226,282, and a continuation-in-part of application No. 09/598,697, filed on Jun. 21, 2000, now Pat. No. 6,826,590.

(60) Provisional application No. 60/315,067, filed on Aug. 28, 2001, provisional application No. 60/314,093, filed on Aug. 23, 2001, provisional application No. 60/139,814, filed on Jun. 21, 1999, provisional application No. 60/024,346, filed on Aug. 23, 1996.

(51) Int. Cl.
| | |
|---|---|
| G05B 15/00 | (2006.01) |
| G05B 11/01 | (2006.01) |
| G06F 7/00 | (2006.01) |
| G06F 17/30 | (2006.01) |
| G06F 17/00 | (2006.01) |
| G06F 3/00 | (2006.01) |
| G06F 9/00 | (2006.01) |
| G06F 15/16 | (2006.01) |
| G06F 15/177 | (2006.01) |
| G06F 15/173 | (2006.01) |

(52) U.S. Cl. .......................... 700/83; 700/17; 700/19; 707/10; 707/104.1; 709/203; 709/219; 709/220; 709/223; 715/854

(58) Field of Classification Search .................. 700/11, 700/17–19, 83, 89; 707/10, 104.1; 709/203, 709/217–220, 223, 224; 715/853, 854
See application file for complete search history.

(56) References Cited

U.S. PATENT DOCUMENTS

RE27,703 E 7/1973 Stafford et al.

(Continued)

FOREIGN PATENT DOCUMENTS

WO 97 29409 8/1997

(Continued)

OTHER PUBLICATIONS

Berge J.(Plug-N-Play Control Systems Integrating Foundation Fieldbus and OPC) 1999 pp. 123-131.

(Continued)

*Primary Examiner*—Crystal J. Barnes
(74) *Attorney, Agent, or Firm*—Dorsey & Whitney LLP (57) ABSTRACT

A new and improved control system architecture with a single server interface for application software that eliminates manual intervention by providing online, immediate access to information needed for plant/enterprise optimization, operation, configuration, maintenance and diagnostic application software. The control system architecture provides a method of dynamically creating a server directory to enable automatic access in an integrated control system. The method includes accessing a live list of fieldbus devices, building/updating a browse tree structure, the browse tree structure defining a branch and leaf node organization and naming for and data from the fieldbus devices, copying AP directories and FF objects from active fieldbus devices into a FF directory and mapping the FF Directory into the server directory.

20 Claims, 8 Drawing Sheets

U.S. PATENT DOCUMENTS

| | | |
|---|---|---|
| 4,074,565 A | 2/1978 | Harris et al. |
| 4,099,242 A | 7/1978 | Houston et al. |
| 4,283,634 A | 8/1981 | Yannone et al. |
| 4,347,563 A | 8/1982 | Paredes et al. |
| 4,430,699 A | 2/1984 | Segarra et al. |
| 4,484,273 A | 11/1984 | Stiffler et al. |
| 4,531,193 A | 7/1985 | Yasuhara et al. |
| 4,591,977 A | 5/1986 | Nissen et al. |
| 4,819,149 A | 4/1989 | Sanik et al. |
| 4,831,558 A | 5/1989 | Shoup et al. |
| 4,864,489 A | 9/1989 | Yahuhara et al. |
| 4,888,726 A | 12/1989 | Struger et al. |
| 4,938,068 A | 7/1990 | Clements |
| 4,969,083 A | 11/1990 | Gates |
| 4,992,926 A | 2/1991 | Janke et al. |
| 5,115,675 A | 5/1992 | Feldman et al. |
| 5,122,794 A | 6/1992 | Warrior |
| 5,151,978 A | 9/1992 | Bronikowski et al. |
| 5,159,673 A | 10/1992 | Sackmann et al. |
| 5,166,678 A | 11/1992 | Warrior |
| 5,245,704 A | 9/1993 | Weber et al. |
| 5,251,302 A | 10/1993 | Weigl et al. |
| 5,329,579 A | 7/1994 | Brunson |
| 5,333,114 A | 7/1994 | Warrior et al. |
| 5,434,774 A | 7/1995 | Seberger |
| 5,448,231 A | 9/1995 | Takezoe et al. |
| 5,451,923 A | 9/1995 | Seberger et al. |
| 5,452,201 A | 9/1995 | Pieronek et al. |
| 5,453,924 A | 9/1995 | Monson et al. |
| 5,457,999 A | 10/1995 | Feldman |
| 5,485,142 A | 1/1996 | Stute et al. |
| 5,485,400 A | 1/1996 | Warrior et al. |
| 5,506,956 A | 4/1996 | Cohen |
| 5,513,324 A | 4/1996 | Dolin, Jr. et al. |
| 5,526,358 A | 6/1996 | Gregerson et al. |
| 5,537,547 A | 7/1996 | Chan et al. |
| 5,537,626 A | 7/1996 | Kraslavsky et al. |
| 5,546,584 A | 8/1996 | Lundin et al. |
| 5,553,297 A | 9/1996 | Yonezawa et al. |
| 5,579,482 A | 11/1996 | Einkauf et al. |
| 5,608,720 A | 3/1997 | Biegel et al. |
| 5,682,476 A | 10/1997 | Tapperson et al. |
| 5,684,451 A | 11/1997 | Seberger et al. |
| 5,691,896 A | 11/1997 | Zou et al. |
| 5,706,007 A | 1/1998 | Fragnito et al. |
| 5,754,596 A | 5/1998 | Baschoff et al. |
| 5,764,267 A | 6/1998 | Warrior |
| 5,764,955 A | 6/1998 | Doolan |
| 5,768,119 A | 6/1998 | Havekost et al. |
| 5,793,963 A | 8/1998 | Tapperson et al. |
| 5,796,602 A | 8/1998 | Wellan et al. |
| 5,796,721 A | 8/1998 | Gretta, Jr. |
| 5,801,942 A | 9/1998 | Nixon et al. |
| 5,805,442 A | 9/1998 | Crater et al. |
| 5,825,664 A | 10/1998 | Warrior et al. |
| 5,828,851 A | 10/1998 | Nixon et al. |
| 5,834,861 A | 11/1998 | Kanzaki et al. |
| 5,838,563 A | 11/1998 | Dove et al. |
| 5,841,654 A | 11/1998 | Verissimo et al. |
| 5,850,523 A | 12/1998 | Gretta, Jr. |
| 5,854,890 A | 12/1998 | Ramachandran et al. |
| 5,859,959 A | 1/1999 | Kimball et al. |
| 5,862,052 A | 1/1999 | Nixon et al. |
| 5,881,311 A | 3/1999 | Woods |
| 5,889,817 A | 3/1999 | Yoshida |
| 5,903,455 A * | 5/1999 | Sharpe et al. ................. 700/83 |
| 5,909,368 A | 6/1999 | Nixon et al. |
| RE36,263 E | 8/1999 | Janke et al. |
| 5,960,214 A | 9/1999 | Sharpe, Jr. et al. |
| 5,963,147 A | 10/1999 | Westfield et al. |
| 5,970,430 A | 10/1999 | Burns et al. |
| 5,971,581 A | 10/1999 | Gretta et al. |
| 5,975,737 A | 11/1999 | Crater et al. |
| 5,978,578 A | 11/1999 | Azarya et al. |
| 5,978,850 A | 11/1999 | Ramachandran et al. |
| 5,980,078 A | 11/1999 | Krivoshein et al. |
| 5,982,362 A | 11/1999 | Crater et al. |
| 5,995,916 A | 11/1999 | Nixon et al. |
| 6,014,612 A | 1/2000 | Larson et al. |
| 6,017,143 A | 1/2000 | Eryurek et al. |
| 6,026,352 A | 2/2000 | Burns et al. |
| 6,032,208 A | 2/2000 | Nixon et al. |
| 6,044,305 A | 3/2000 | Larson et al. |
| 6,047,220 A | 4/2000 | Eryurek |
| 6,047,222 A | 4/2000 | Burns et al. |
| 6,061,603 A | 5/2000 | Papadopoulos et al. |
| 6,076,952 A | 6/2000 | Gretta et al. |
| 6,078,320 A | 6/2000 | Dove et al. |
| 6,094,600 A | 7/2000 | Sharpe, Jr. et al. |
| 6,095,674 A | 8/2000 | Verissimo et al. |
| 6,098,116 A | 8/2000 | Nixon et al. |
| 6,102,965 A | 8/2000 | Dye et al. |
| 6,119,047 A | 9/2000 | Eryurek et al. |
| 6,151,625 A | 11/2000 | Swales et al. |
| 6,266,726 B1 | 7/2001 | Nixon et al. |
| 5,131,092 A1 | 7/2002 | Sackmann et al. |
| 6,424,872 B1 | 7/2002 | Glanzer et al. |
| 6,446,202 B1 * | 9/2002 | Krivoshein et al. ............ 713/1 |
| 6,484,061 B1 | 11/2002 | Papadopoulos et al. |
| 6,594,530 B1 | 7/2003 | Brett et al. |
| 6,826,590 B1 | 11/2004 | Glanzer et al. |
| 6,999,824 B1 | 2/2006 | Glanzer et al. |
| 2002/0112044 A1* | 8/2002 | Hessmer et al. ............ 709/223 |
| 2004/0194101 A1 | 9/2004 | Glanzer et al. |
| 2005/0021705 A1* | 1/2005 | Jurisch ...................... 709/223 |
| 2005/0240286 A1 | 10/2005 | Glanzer et al. |
| 2005/0240287 A1 | 10/2005 | Glanzer et al. |
| 2006/0025872 A1 | 2/2006 | Glanzer et al. |

FOREIGN PATENT DOCUMENTS

| | | |
|---|---|---|
| WO | WO 98/02993 | 1/1998 |
| WO | WO 99/48245 | 9/1999 |

OTHER PUBLICATIONS

Bangemann et. al (Integration of Fieldbus Systems in Computer-Aided Facility Management) Aug. 31, 1998 pp. 1835-1840.

Neumann et. al (Integration of Fieldbus Systems Into Distributed Object-Oriented Systems) Oct. 1, 1997 pp. 247-253.

Berge J. et. al (Building Better Open Networks Using Foundation Fieldbus and OPC) Feb. 2000 pp. 75-78,81-82.

OPC Task Force Oct. 27, 1998 pp. 1-27.

Arpaia et al., "A Distributed Laboratory Based on Object-Oriented Measurement Systems", Measurement, vol. 19, No. 3/4, pp. 207-215, 1996.

Cheah et al., "Design and Implementation of an MMS Environment on Isode", Computer Communications, vol. 20, pp. 1354-1364, 1997.

Drakopoulos, Elias, "Enterprise Network Planning and Design: Methodology and Application", Computer Communications, vol. 22, pp. 340-352, 1999.

He et al., "Clock Synchronization in Real-Time Distributed Systems Based on FIP Field Bus", Centre de Recherche en Informatique de Nancy, pp. 135-141, Sep. 30, 1990.

Lonn et al., "Synchronisation in Safety Critical Distributed Control Systems", Chalmers University of Technology, Laboratory for Dependable Computing, pp. 891-899, Apr. 19, 1995.

Middeldorp et al., "DFS 2929 Foreign Device Interfaces", pp. 1-13, Oct. 2, 1987.

Middeldorp et al., "CPS 1259 Foreign Device Interface", pp. 1-11, Nov. 3, 1987.

Olson et al., "Probabilistic Clock Synchronization in Large Distributed Systems", Real-Time Computing Laboratory, pp. 290-297, May 20, 1991.

Shaughnessy, Ed, "DFS 1592 Master Timekeeper", pp. 1-32, Mar. 19, 1986.

* cited by examiner

INTEGRATED FIELDBUS DATA SERVER ARCHITECTURE

CROSS-REFERENCE TO RELATED APPLICATIONS

This application is a continuation-in-part (CIP) application of U.S. patent application Ser. No. 10/160,094, entitled "A Block-Oriented Control System" and filed Jun. 4, 2002 now U.S. Pat. No. 6,594,530, which is a continuation of application Ser. No. 08/916,178 now U.S. Pat. No. 6,424,872 (hereinafter the "'872 patent"), also entitled "A Block-Oriented Control System" and filed Aug. 21, 1997, which claims the priority of U.S. Provisional Application No. 60/024,346, filed Aug. 23, 1996. This application is also a CIP of U.S. patent application Ser. No. 09/598,697 (hereinafter the "'697 application"), entitled "Block-Oriented Control System On High Speed Ethernet" and filed Jun. 21, 2000 now U.S. Pat. No. 6,826,590, which claims the priority of U.S. Provisional Application No. 60/139,814, filed Jun. 21, 1999. This application also claims priority of U.S. Provisional Application No. 60/314,093, filed Aug. 23, 2001, and U.S. Provisional Application No. 60/315,067 filed Aug. 28, 2001. All of the above-mentioned applications and patent are hereby incorporated by reference in their entirety.

TECHNICAL FIELD

The present invention relates to automatic control system architecture. More particularly, the present invention relates to how plant and enterprise application software accesses control system data including fieldbus data, needed for plant and enterprise management, operation, configuration, maintenance, and diagnostic functions of the control system.

BACKGROUND

Automatic control systems are critical to all sectors of industry such as process control, discrete control, batch control (process and discrete combined), machine tool control, motion control, and robotics. One of the strongest needs in modern control systems is development and use of "open" and "interoperable" systems. Open, interoperable systems allow control devices made by different manufacturers to communicate and work together in the same system without the need for custom programming. The movement toward open, interoperable control systems is driven by plant and enterprise management, application software suppliers, control device manufacturers, and end users. Plant and enterprise management want open, interoperable control systems because they need access to all of the control system information in order to provide the analysis needed to optimize the operation of the plant and enterprise. Client Application Software suppliers want open, interoperable control systems so that their software can access the control system data using standard computer platforms running standard operating systems, and interconnected by standard communication systems. Control device manufacturers want open, interoperable control systems because such systems allow them to sell their products to more end users while reducing development costs. End users want open, interoperable control systems so that they can select the best application software and control devices for their system regardless of the manufacturer.

In order for control systems to be truly open and interoperable, communications systems between devices, the user layer (above the communication system layers) in the devices, and the computer/application software integration architecture must be specified and made open. "Fieldbus" is the common term used to describe these types of automatic control systems.

One of the truly open and interoperable fieldbus control systems is the FOUNDATION™ fieldbus ("FF") system provided by the Fieldbus Foundation (Austin, Tex.). The FF user layer and a lower speed 31.25 kilobits/second fieldbus (H1) is described in the above-mentioned '892 patent. A High Speed Ethernet (HSE) fieldbus, running at 100 megabit/second or higher speeds, is described in the above-mentioned '697 application. The '892 patent and the '697 application are assigned to the assignee of the present application.

H1 provides the open and interoperable solution for field level control capability and integration, and HSE provides the open and interoperable solution for distributed control on a very high performance communication system typically called a fieldbus control "backbone" network. The HSE control backbone aggregates information from lower speed control devices, e.g., the H1 devices and other control devices, which is used in supervisory and advanced control applications. The HSE control backbone aggregates data from high-speed control devices, e.g., HSE devices and other subsystems, and provides access/change of H1 and HSE control information by control system computers.

The plant/enterprise application software operates at the "client" and "server" levels in the control system hierarchy. An open and interoperable integrated fieldbus data server architecture (meaning client and server) is needed that will provide a framework and common specification for the "semantics" (how the application software understands the control system data) of fieldbus data, whether it is H1 or HSE data, or other control data. Prior to the present invention, client application software on the plant/enterprise computers had to be manually customize and adapt data received from each server that provided access to fieldbus or other control device data because each server identified and represented the same semantic information differently. A requirement for modem servers is to eliminate the need to manually customize or adapt client application software; the present application addresses this requirement.

Existing server specifications provide for automatic adaptation of very limited subsets of runtime data because this data can be understood through syntax only, e.g. message structure. For example, the OLE for Process Control (OPC) Specification from the OPC Foundation (Boca Raton, Fla.) provides for the limited adaptation through standardization of the basic access mechanism and syntax for runtime data, e.g. simple process variables (PV) and setpoints (SP). The OPC Specifications are general enough to allow extra information, called "properties" to define "class" attributes of the runtime data. Class attributes include "Device Description" (DD) information for the runtime data, e.g. help strings, engineering units, and parameter labels. Some DD information is complex, for example containing conditionals, menus, and methods (which are C programs). Additional class attributes are provided by "Capability Files" (CF) that describe the range of capability of the fieldbus device or other control device, e.g. maximum number of parameters, initial values of parameters, and maximum number of communication sessions. However, although OPC allow servers to define class attributes, there is no standardized definition for class attributes, thus limiting interoperability with, and automatic adaptation by, client application software Further, even if class attributes could be standardized for server data, the client application software also needs to know which "instance" of the runtime data is being described by the class attributes. That is, the class attributes can tell the client application software what type of runtime data is being accessed, but they cannot identify the specific data that is being accessed. Instance information can be provided by accessing application directories (which locate the runtime data) in the fieldbus devices, but like class attributes, there is no standardized definition of the application directory information making interoperability and automatic adaptation of the client application software impossible.

Advanced Human/Machine Interface ("HMI"), trending, asset management, configuration, maintenance, diagnostic and plant/enterprise management application software must have access to runtime data and the class attributes and application directory semantic information that allows the software to automatically identify, interpret, and process the runtime data without manual intervention. Finally, to be efficient, the client application software must be able to access the runtime data and the semantic information through a single interface.

The OPC Specification is unable to automatically and efficiently support these advanced applications because there is no open and interoperable framework or specification for providing the above described semantic information to the client software applications through the same interface that is currently used to access runtime data.

What is needed is a framework and a common specification for an integrated fieldbus data server architecture that can provide semantics of runtime data, both simple and complex, to the client application software.

What is needed is a framework and a common specification for an integrated fieldbus data server architecture that migrates support for existing plant/enterprise client application software, e.g., HMI and other OPC software applications, while standardizing and integrating the semantics needed for automatic identification, interpretation, and processing of runtime data by advanced client application software, e.g., plant/enterprise management, configuration, maintenance, and diagnostics application software.

What is needed is an integrated fieldbus data server architecture that complements H1, HSE and other fieldbus architectures so the plant/enterprise application software can automatically interpret the runtime data using corresponding semantic information.

What is needed is an integrated fieldbus data server architecture provides a single interface for access of the runtime data and corresponding semantic information by the plant/enterprise application software.

SUMMARY

Embodiments of the present invention overcome the shortcomings described above and otherwise. Embodiments of the present invention satisfy the above-described needs. Embodiments of the present invention provide a new and improved control system architecture with a single server interface for Client Application Software that eliminates manual intervention by providing online, immediate electronic access to the runtime data and semantic information by advanced plant/enterprise management, operation, configuration, maintenance and diagnostic application software.

The embodiments of the present invention are collectively referred to herein as the "Integrated Fieldbus Data Server Architecture" (IFDSA). IFDSA provides the framework and specification for mapping the semantic information of runtime data such as H1 and HSE fieldbus device data described in the '892 patent and '697 application, respectively, and further defines a single interface for client application software. The IFDSA framework enables automatic adaptation to FF and other control device types.

The elimination of manual intervention for setup of advanced application packages is achieved by providing a method and apparatus for accessing the runtime "live list" of active FF devices and building/updating a Standardized Browse Tree Structure formatted to be compatible OPC Specifications available from the OPC Foundation and mapping FF Directory information (which provides the semantic information for all FF fieldbus and other control device runtime data) into a new Server Directory. The Server Directory contains the same semantic information as the FF Directory, but is formatted to be compatible OPC Specifications available from the OPC Foundation. The OPC-compatible browse tree and semantic information is then provided to the client application software transparently by the servers.

The IFSDA achieves a single interface because the Client Application Software at the client no longer has to use separate interfaces to access semantic information and runtime data. Since the mapping of FF semantic and runtime data to OPC Specifications is above the communication layers, this solution remains valid as implementations evolve to newer technologies, e.g., web services.

BRIEF DESCRIPTION OF THE DRAWINGS

Features and advantages of the present invention will become apparent to those skilled in the art from the following description with reference to the drawings, in which like numerals refer to like items and.

DETAILED DESCRIPTION

For simplicity and illustrative purposes, the present invention is described by referring mainly to exemplary embodiments, particularly, with a specific exemplary implementation of a control system using H1, HSE, OPC (meaning both client and server operations), and Client Application Software. However, one of ordinary skill in the art would readily recognize that the same principles are equally applicable to, and can be implemented in, other implementations and designs using any other integrated architecture, and that any such variation would be within such modifications that do not depart from the true spirit and scope of the present invention. Specifically, one of ordinary skill in the art would readily recognize that principles applying to OPC in the exemplary implantation are equally applicable to non-OPC implementations.

I IFDSA Overview

Figure 1:
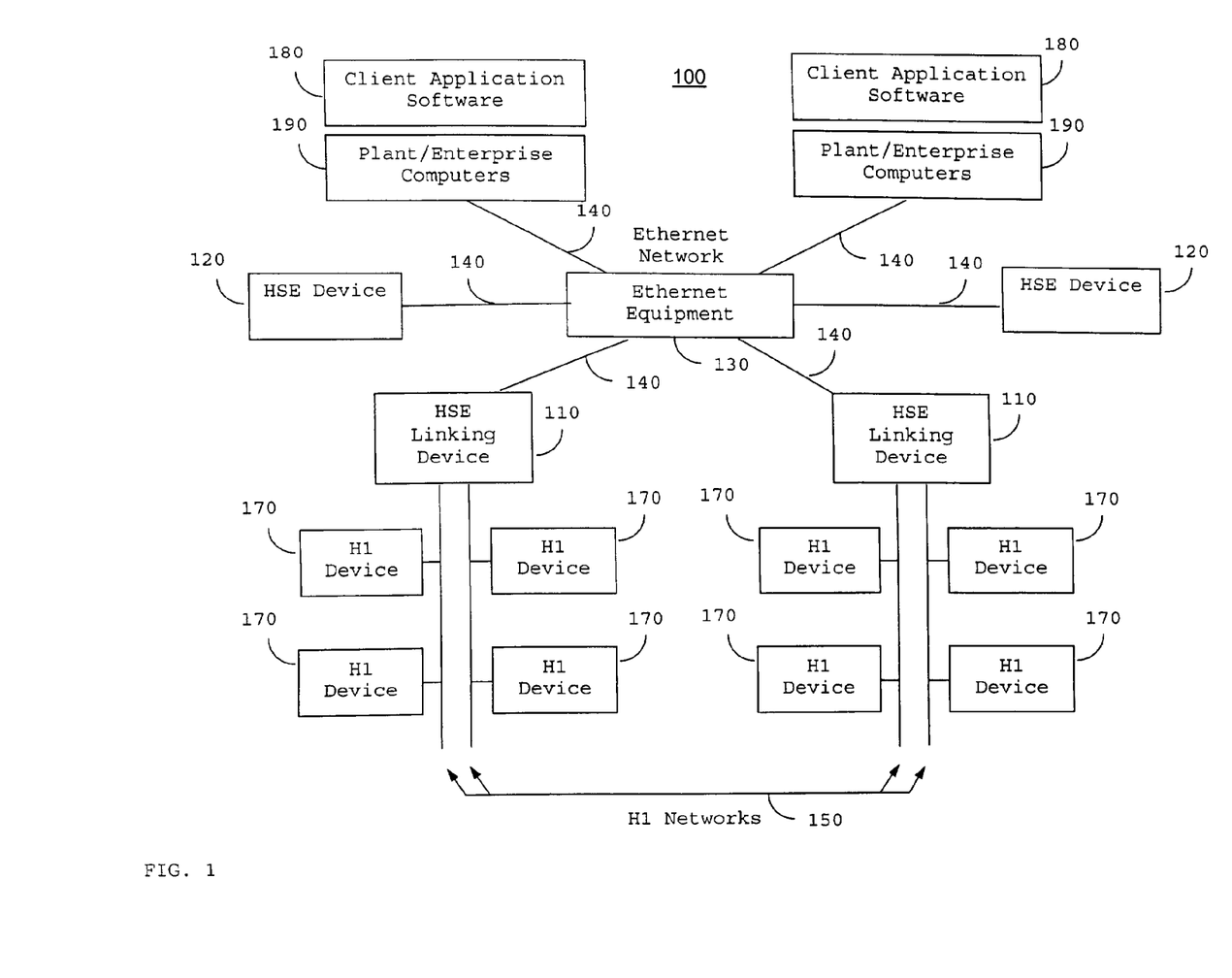
FIG. 1 is a block diagram showing an exemplary embodiment of an integrated open and interoperable control system in accordance with the principles of the present invention.

Referring to FIG. 1, an example of an integrated control system architecture 100 is shown where standard Ethernet equipment 130 is used to interconnect HSE Linking Devices 110, HSE Devices 120, and Plant/Enterprise Computers 190 to Ethernet Network 140. The HSE Linking Devices 110 in turn connect to H1 Devices 170 using H1 Networks 150. Client Application Software 180 runs on the Plant/Enterprise Computers 190. Server software may run on Plant/Enterprise Computers 190, HSE Linking Device 110 or HSE Device 120. Client Application Software 190 may also run on HSE Linking Device 110 or HSE Device 120. The actual hardware and software configuration will depend on the particular application needs. However, network topology, devices or configuration other than the exemplary topology shown in FIG. 1 may be used, and such variations would be within such modifications that do not depart from the true spirit and scope of the present invention.

Figure 2:
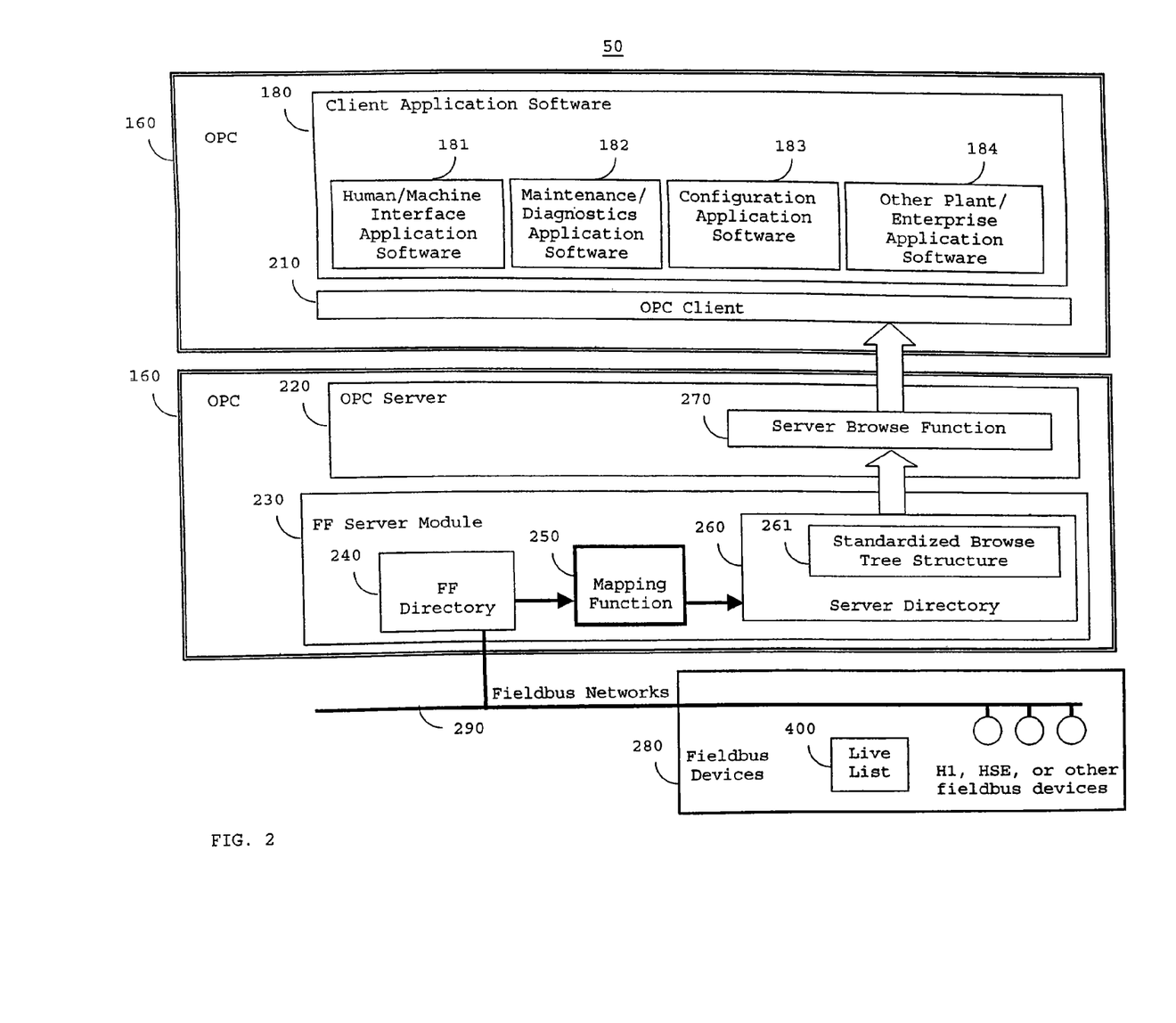
FIG. 2 is a block diagram showing an exemplary embodiment of an integrated fieldbus data server architecture with FF Directory Mapping in accordance with the principles of the present invention.

IFDSA components in accordance with an embodiment of the principles of the present invention are shown in FIG. 2. IFDSA is designed to meet the functional needs of the integrated, high performance distributed manufacturing and process control environments, e.g., utilizing H1, HSE, OPC and Client Application Software. IFDSA permits distributed automation systems to be constructed from various H1, HSE, and other control and measurement devices, client application software and server software manufactured by different vendors. IFDSA is described by architecture components that have been adapted to the specifics of H1, HSE and OPC environments.

The various protocols and standards referenced in the following disclosure are described in detail in the manuals and specifications listed in Appendix I herein, which are publicly available from the Fieldbus Foundation, a not-for-profit organization headquartered in Austin, Tex. The specifications and manuals may be ordered by calling 512-794-8890 or online at www.fieldbus.org. The respective current versions of each of these manuals and specifications are hereby incorporated by reference in their entirety. Each of the architecture components of IFDSA (shown in FIG. 2) are described in more detail below.

II. IFDSA Components

FIG. 2 illustrates an exemplary embodiment of the IFDSA 50. As shown, the IFDSA 50 preferably comprises OPC 160 and Fieldbus Devices 280 (e.g., H1 Devices 170 and HSE Devices 120—See FIG. 1). The functions and components of OPC 160 may be combined into a single OPC 160 computer or spread among multiple OPC 160 computers. OPC 160 preferably communicates with the Fieldbus Devices 280 via Fieldbus Networks 290 (e.g., H1 Networks 150 and Ethernet Networks 140—see FIG. 1).

In the embodiment shown, OPC 160 preferably includes Client Application Software 180 and an OPC Client 210. Client Application Software 180 uses OPC Client 210 to access information in an OPC Server 220. OPC Client 210 and OPC Server 220 can reside in a single computer or they may be in separate computers on a communication network (the communication network between the client and server is not shown in FIG. 2).

The Client Application Software 180 running in OPC 160 may include a variety of software (e.g., as separate programs or separate modules of the same software). For example, the Client Application Software 180 may include Human/Machine Interface Application Software 181, Maintenance/Diagnostics Application Software 182, Configuration Application Software 183, and Other Plant/Enterprise Application Software 184. The preferred embodiment defines existing client application software to be included in Other Plant/Enterprise Application Software 184.

Referring again to the embodiment shown in FIG. 2, a second OPC 160 computer preferably includes an OPC Server 220 and a FF Server Module 230. The OPC Server 220 may be a virtual server, for example, and preferably includes a Server Browse Function 270. Communications are preferably enabled and maintained between the OPC Server 220, specifically the Server Browse Function 270, and the OPC Client 210. The FF Server Module 230 preferably includes a FF directory 240, a Mapping Function 250, and Server Directory 260. Communications are also preferably enabled and maintained between the OPC Server 220, specifically the Server Browse Function 270, and the FF Server Module 230, specifically the Server Directory.

III. IFDSA Directory Mapping

With continued reference to the embodiment illustrated in FIG. 2, the FF Server Module 230 preferably monitors a Live List 400 that represents the active fieldbus devices in Fieldbus Devices 280. In the preferred embodiment, Live List 400 is created in accordance with the FF Specifications in Appendix I and available from the Fieldbus Foundation. Live List 400 identifies Fieldbus Devices 280 available to FF Server Module 230. For each device listed in the Live List 400, there is a corresponding list of vendor specific identifiers called Object Dictionary (OD) Indexes (OD Indexes not shown in FIG. 2). OD Indexes have corresponding runtime objects in the Fieldbus Devices 280. Exemplary runtime objects in a device are described the '892 application and include a resource block object, transducer block objects, function block objects, trend objects, view objects, link objects, alert objects, system time objects, function block schedule objects, and network traffic objects.

The runtime objects are preferably defined as FF Objects by the FF Specifications referenced in Appendix I, although a vendor can define additional runtime objects. In either case, DD and CF technology mentioned above and described in the '892 application (and the FF Specifications listed in Appendix I) are preferably used to describe the runtime objects. DD and CF files extend the descriptions of each object in a device that is needed for a control system to interpret the meaning of the data in the fieldbus device, including the human interface functions, such as calibration and diagnostics.

The DD/CF files can be written in ASCII text or any standardized programming language, such as C, C++, or SmallTalk. In the preferred embodiment, DD files are written in the DD Language (DDL) and CF files are ASCII text files as described by the FF Specification listed in Appendix I and available from the Fieldbus Foundation.

The FF Directory 240 is preferably composed of the list of all Fieldbus Devices 280, called the Live List, and the AP directories contained in each FF device. The Live List may be constructed by listening to FF network traffic, or it may be read from Fieldbus Devices 280 that contain it. AP directories are read by the FF Server Module 230 from the Fieldbus Devices Fieldbus Devices 280 via the Fieldbus Networks 290, or the AP Directories can be obtained locally by reading the CF file (The DD and CF files are provided with every FF fieldbus device).

The OD Index is used as a key attribute in FF protocol services to access the runtime objects. Consequently, Client Application Software 180 can access runtime data in the Fieldbus Devices 280 by obtaining their corresponding OD indexes from the FF Directory 240.

OPC 160 models runtime objects as "OPC Items". OPC Items are identified by "Item IDs" that contain vendor-specific names. OPC Items in the OPC Server 220 are presented to the OPC Clients 210 via a Server Browse Function 270. The Server Browse Function 270 allows the OPC Server 220 to locate OPC Items in a tree structure that is constructed per the OPC specifications. The OPC Client 210 uses the Server Browse Function 270 to locate items of interest.

Currently, there is no standardization of branch and leaf node organization or ID naming used in the Server Browse Function 270 and, therefore, the OPC Client 210 cannot locate OPC Items of interest without manual interpretation of the browse tree and each OPC Item in it. This precludes OPC Clients 210 from automatically accessing and processing OPC Items in the OPC Server 220.

To solve this problem, the IFDSA 50 provides a standard Server Directory 260 that is created to represent the FF Directory 240. The Server Directory contains the same object semantic information as the FF Directory 240, but is mapped to be compatible with OPC objects. The Standardized Browse Tree Structure 261 in the Server Directory 260 defines the branch and leaf node organization and naming for the Fieldbus Devices 160 so that the Server Browse Function 270 can locate its representation of Fieldbus Devices 280 and their data through the OPC compatible semantic information in Server Directory 260. Once located, the OPC compatible semantic information and data values (if any) are provided to the Client Application Software 180 transparently using via the Server Browse Function 270 and related OPC 160 services.

The Mapping Function 250 maps the Fieldbus Devices 280 Live List 400 and Application Process (AP) Directory information to the Server Directory 260 with an automatically generated OPC Access Path Name and/or a Fully Qualified Item ID, referred to below as the OPC Item Reference. The AP Directory is written in accordance with the manuals or specifications listed in Appendix I and available from the Fieldbus Foundation. The OPC Access Path name defines the server-specific path through the Server Browse Function 270 to the FF Directory 240. The OPC Fully Qualified Item ID is a handle to the item representing a corresponding Runtime Object in the FF Directory 240. The OPC Access Path, OPC Fully Qualified Item ID and Server Browse Function are written in accordance with OPC Specifications and available from the OPC Foundation.

Figure 3A:
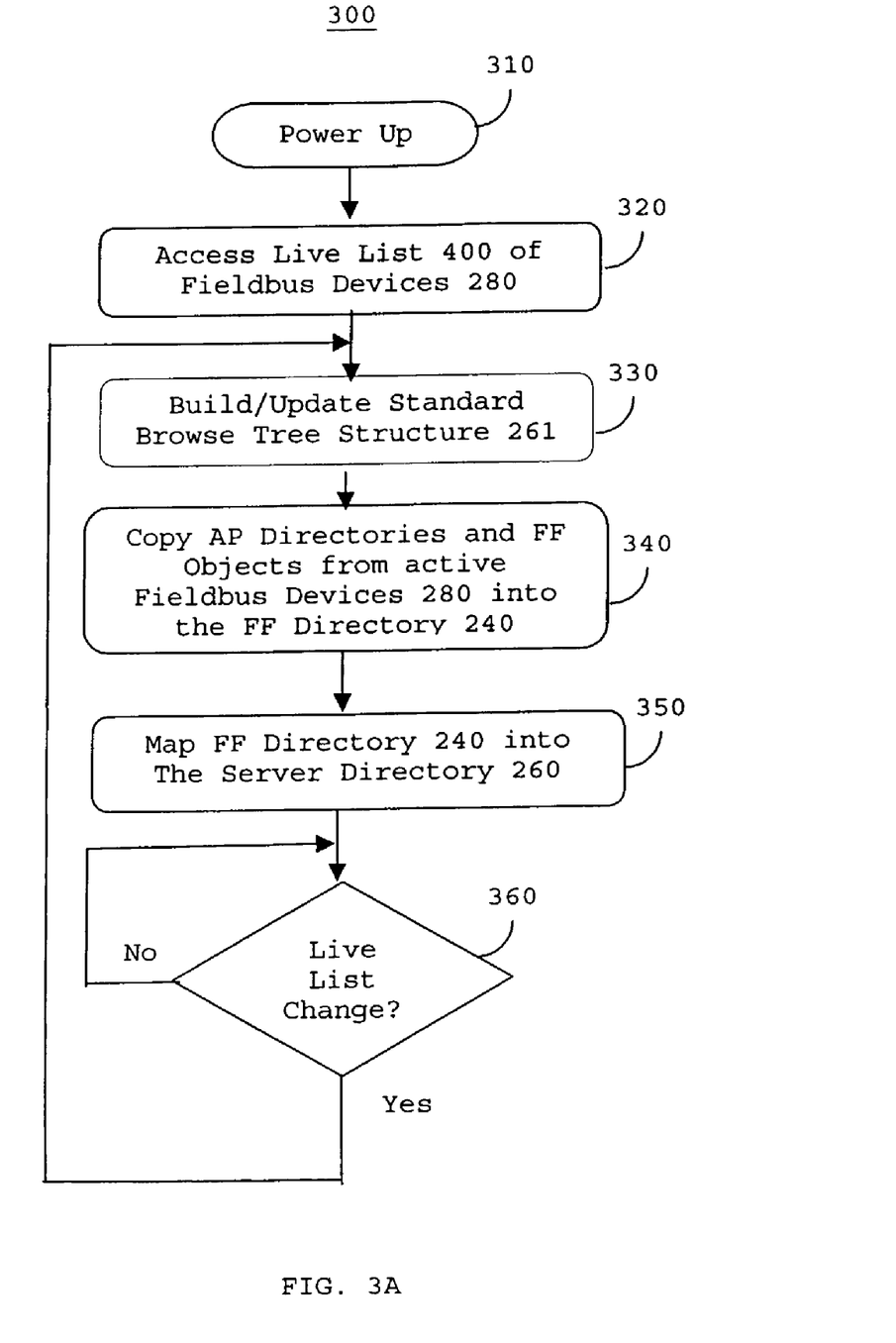
FIG. 3A is a flowchart illustrating an exemplary method of creating a Server Directory to enable automatic access in an exemplary embodiment of an integrated fieldbus data server architecture in accordance with the principles of the present invention.

FIG. 3A illustrates an embodiment of a method 300 of creating a Server Directory 260 to enable automatic access. As seen, the method 300 starts when the integrated control system powers-up 310 and includes the steps of: Accessing the Live List 400 of Fieldbus Devices 280, step 320; Building/Updating the Standardized Browse Tree Structure 261, step 330; Copying AP Directories and FF Objects from active Fieldbus Devices 280 into the FF Directory 240, step 340; Mapping the FF Directory 240 into the Server Directory 260, step 350; determining if there is a Live List 400 change, step 360; and, if yes, repeating steps 33–60, and if no, repeating step 360.

The access step 320 preferably is performed using protocol services defined in the FF Specifications in Appendix I and available from the Fieldbus Foundation. The building/updating step 330 initially builds the Standardized Browse Tree Structure 261 with Live List 400 Device Identification information read from Fieldbus Devices 280. The reading of information in step 330 preferably is performed using protocol services defined in the FF Specifications in Appendix I and available from the Fieldbus Foundation. (Please see FIG. 3B and its corresponding description below for a more detailed description of the data accessed by this step.) The copying step 340 is preferably performed by 1) reading the AP Directories and FF Objects of Fieldbus Devices 280 corresponding to active devices in the Live List 400 using protocol services defined in the FF Specifications in Appendix I and available from the Fieldbus Foundation and placing the data in a buffer, and 2) copying the data from the buffer to the FF Directory 240. The mapping step 350 maps the data in FF Directory 240 to the Server Directory 260 by mapping, for each device, an AP Directory, and each FF Object contained in the FF Directory 240 to OPC Items in the Server Directory 260. Please see FIGS. 4–6 and their corresponding description below for more detailed descriptions of this step and alternative steps of mapping these to OPC Items.

With continued reference to FIG. 3A, the determining step 360 dynamically determines if there is a change in the Live List 400. Step 360 uses the same protocol as Step 320 to access Live List 400 and then compares the new copy of the Live List just obtained with the previous copy and determines which fieldbus devices have been added or removed from Fieldbus Devices 280 since the last execution of Step 360. The determining step 360, therefore, enables the IFDSA 50 to dynamically map the FF Directory 240 to the Server Directory 260.

Figure 3B:
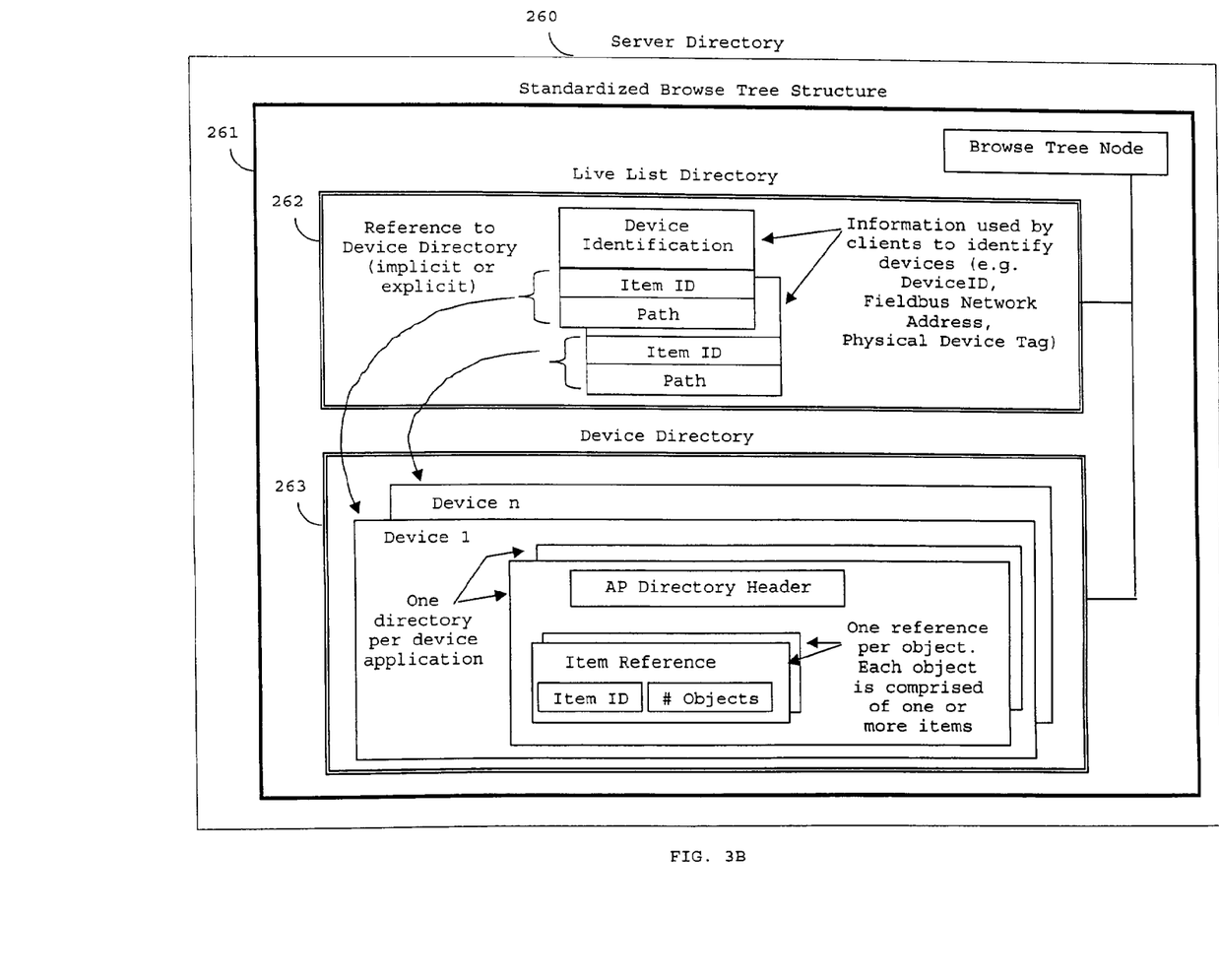
FIG. 3B is a diagram illustrating an exemplary Standardized Browse Tree Structure in the Server Directory and graphically illustrating a step of building/updating the Standardized Browse Tree Structure with exemplary Live List and Device Directories, from the method of creating a Server Directory to enable automatic access.

FIG. 3B illustrates an exemplary Server Directory 260 with an exemplary Standardized Browse Tree Structure 261 and graphically illustrates an embodiment of the build/update step 330. As shown, the Standardized Browse Tree Structure 261 includes a Live List Directory 262 entry and a Device Directory 263 entry for each active field device in Fieldbus Devices 280 referenced explicitly by a Live List Directory 262 entry as shown in the figure, or implicitly referenced as a child node or property of the Live List Directory 262 entry (not shown).

Referring to FIGS. 2 and 3B, the Server Directory 260 structure preferably matches the organization of the FF Directory 240 Structure. Each AP Directory reference in the FF Directory 240 is composed of a Starting OD Index and a number of objects. In the preferred embodiment, the Device Identification information, e.g., DeviceID, Fieldbus Network Address, Physical Device Tag, and other related data, provides semantic information that allows clients to automatically identify Fieldbus Devices 280. It is preferably read from Fieldbus Devices 280 using protocol services defined in the FF Specifications in Appendix I and available from the Fieldbus Foundation, and is preferably mapped into the Server Directory 260 using automatically generated Item ID/Path in one of two ways:

1. Each AP Directory reference in the FF Directory 240 as mapped to Server Directory 260 is composed of a Starting OPC Item Reference that identifies the branch that contains the object and the sub-objects of the object are represented as item beneath this branch. The browses order of the items beneath the branch preserves the OD Index ordering as defined in the FF Specifications for the object represented in the AP Directory; or
2. Each AP Directory entry in FF Directory 240 as mapped to Server Directory 260 can be composed of an OPC Item Reference of the corresponding OPC Item. In this case, FF sub-objects in the Server Directory 260 and are represented by their own OPC Item Reference of the OPC Item that corresponds to the sub-object.

Figure 4:
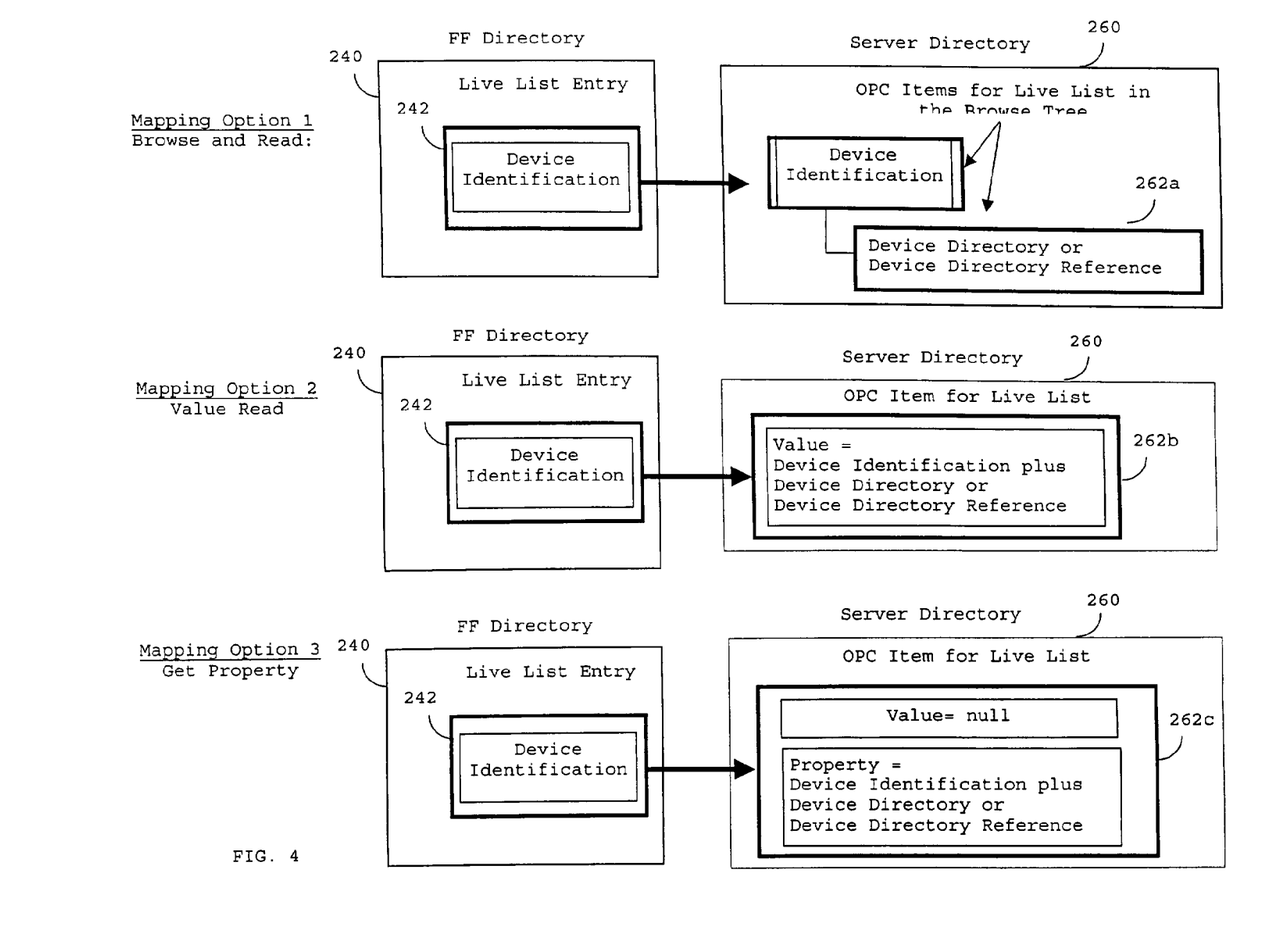
FIG. 4 is a diagram illustrating an exemplary device in a FF Directory and exemplary OPC Items, mapped from the device, in the Server Directory, and graphically illustrating alternative steps of mapping the device into the OPC Item in the Server Directory as part of a step of mapping the FF directory into the Server Directory from the method of creating a Server Directory to enable automatic access.

As shown in FIG. 4, the mapping step 350 of the preferred embodiment of the method 300 maps the Live List Entry 242 from the FF Directory 240 into the Server Directory 260. Exemplary Live List Entry 242 in the FF Directory 240 and exemplary OPC Items 262*a*, 262*b*, and 262*c*, correspond to the alternative mapping options described below. For each mapping options, the OPC Item ID and Path (not shown on figure) are automatically generated.

Mapping Option 1, mapping the Live List Entry 242 to a tree structure of branches and leaf nodes accessed by the OPC Browse and Read service. The Live List Entry 242 preferably includes Device Identification information needed to identify and communicate with the device that is located in Fieldbus Devices 280. OPC Item 262 includes the mapped Device Identification information formatted as an OPC Item per OPC Specifications, and the OPC Item 262*a* includes the device's mapped Device Directory information or a reference, formatted as an OPC Item per OPC Specifications; and Mapping Option 2, mapping the Live List Entry 242 to a single structured OPC Item accessed by the OPC Value Read service. OPC Item 262*b* includes Device Identification information and the device's mapped Device Directory information or a reference to it, formatted and mapped to an OPC Value per OPC Specifications. Accordingly, the Device Directory or a reference to it is included in the value of the Browse Tree item that represents the device, and Mapping Option 3, mapping the Live List Entry 242 to a single structured OPC Item Property accessed by the OPC Get Property service. OPC Item 262*c* includes Device Identification information and the device's mapped Device Directory information or a reference to it, formatted and mapped to OPC Properties per OPC Specifications.

Figure 5:
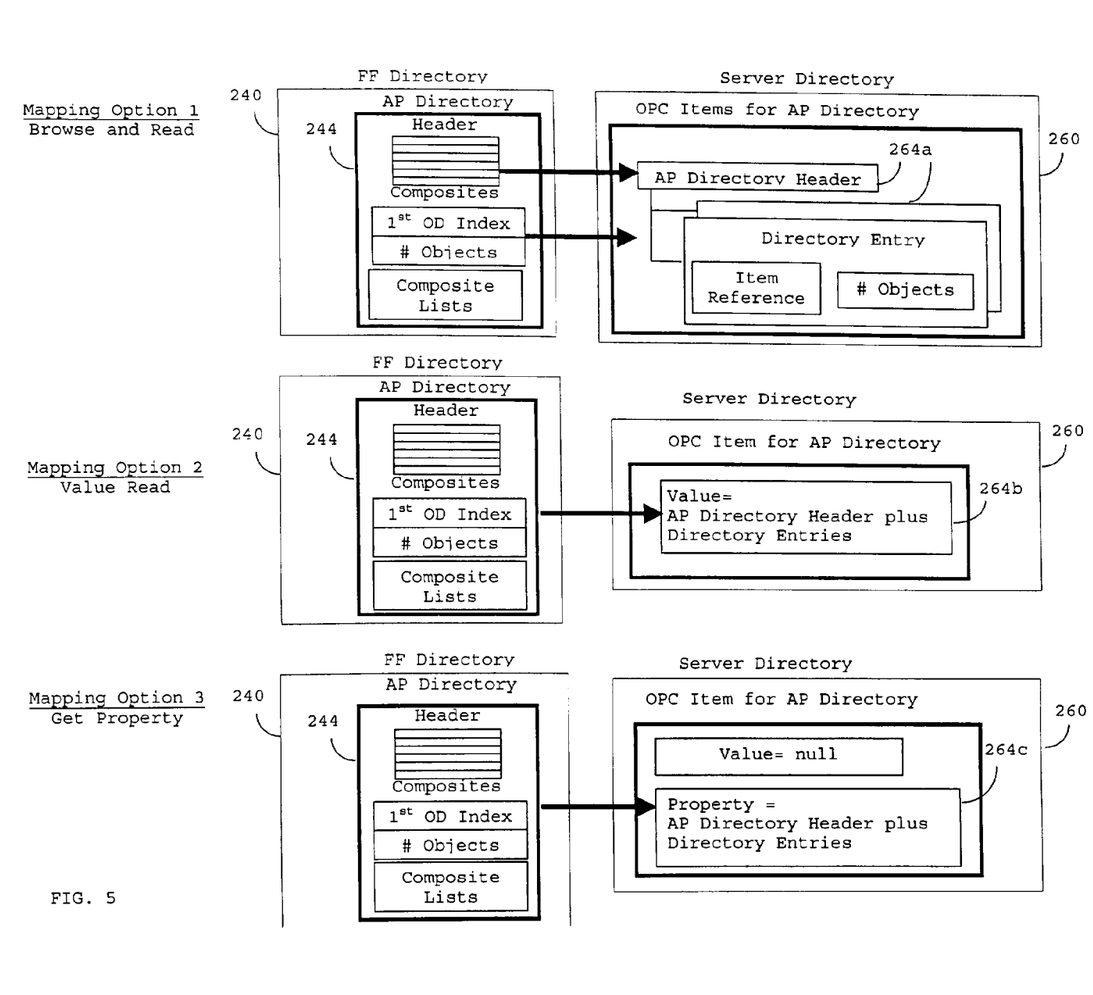
FIG. 5 is a diagram illustrating an exemplary Application Process (AP) Directory in the FF Directory and exemplary OPC Items, mapped from the FF Directory, in the Server Directory, and graphically illustrating alternative steps of mapping the AP Directory into the Server Directory OPC Items as part of the step of mapping the FF directory into the Server Directory from the method of creating a Server Directory to enable automatic access.

FIG. 5 illustrates an exemplary AP Directory 244 in the FF Directory 240 and exemplary OPC Items 264*a*, 264*b* and 264*c*, mapped from the AP Directory 244, in the Server Directory 260. In a preferred embodiment, the AP Directory 244 can be any one of three AP Directories known as the Function Block Application Process ("FBAP") Directory, the System Management Information Base ("SMIB") Directory, the Network Management Information Base ("NMIB") Directory or any other AP Directory that is written in accordance with the manuals or specifications listed in Appendix I and available from the Fieldbus Foundation. As shown, the AP Directory 244 preferably includes Header, Directory Entries (e.g., Composite Object References and, and Composite List References) as defined in the FF Specifications in Appendix I and available from the Fieldbus Foundation. The OPC Items 264*a*, 264*b* and 264*c* correspond to the alternative mapping options described below.

As shown in FIG. 5, the mapping step 350 of the preferred embodiment of the method 300 maps the AP Directory 244 from the FF Directory 240 into the Server Directory 260 by three alternative mapping options or steps that structure the OPC Item References. For all mapping options, the OPC Item ID and Path (not shown on figure) are automatically generated. The AP Directory mapping options or steps are:

Mapping Option 1, mapping the AP Directory 244 to a tree structure of branches and leaf nodes accessed by the OPC Browse and Read service. OPC Item 264*a* includes AP Directory 244 Header information mapped to an OPC Item Header Array, and AP Directory 244 Entries mapped to OPC Item References formatted to OPC Specifications;

Mapping Option 2, mapping the AP Directory 244 to a single structured OPC Item accessed by the OPC Value Read service. OPC Item 264*b* includes the AP Directory Header and the Directory Entries formatted and mapped to an OPC Value per OPC Specifications; and Mapping Option 3, mapping the AP Directory 244 to a single structured OPC Item Property accessed by the OPC Get Property service. OPC Item 262*c* includes AP Directory Header and the Directory Entries formatted and mapped to OPC Properties per OPC Specifications. The OCP Item Value is preferably set to "null."

Figure 6:
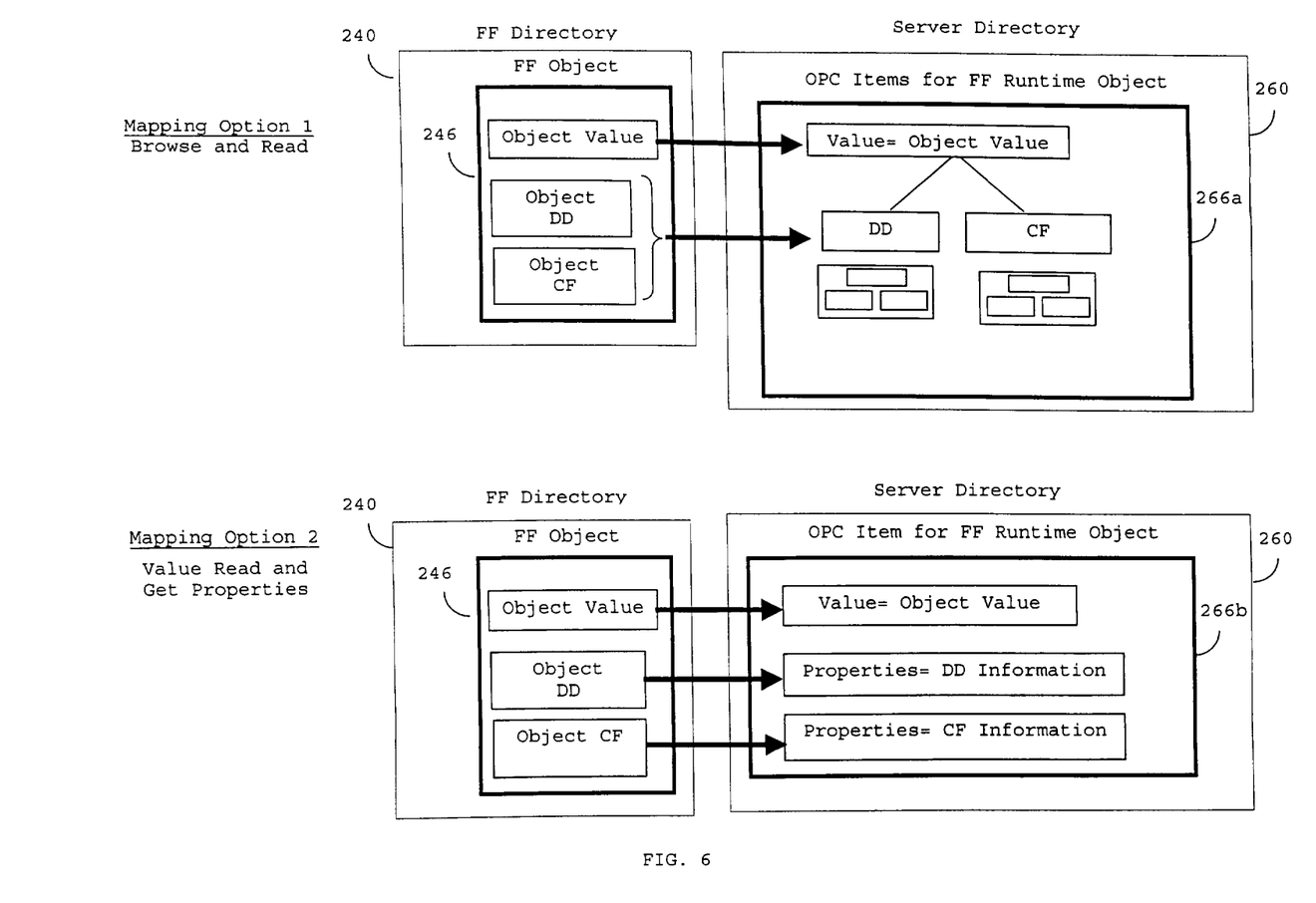
FIG. 6 is a diagram illustrating an exemplary FF Object in the FF Directory and exemplary OPC Items, mapped from the FF Object, in the Server Directory, and graphically illustrating alternative steps of mapping the FF Objects into the Server Directory OPC Items as part of the step of mapping the FF Directory into the Server Directory from the method of creating a Server Directory to enable automatic access.

FIG. 6 illustrates an exemplary FF Object 246 in the FF Directory 240 and exemplary OPC Items 266*a* and 266*b*, corresponding to the alternative mapping options described below and mapped from the FF Object 246, in the Server Directory 260. In a preferred embodiment, the FF Objects 246 are any object written in accordance with the manuals or specifications listed in Appendix I and available from the Fieldbus Foundation. The FF Objects 246 preferably include an object value that can be runtime data, an Object DD that optionally contains the DD for the FF object, and an Object CF, that optionally contains the CF for the FF object. The OPC Items 266*a* and 266*b* correspond to the alternative mapping options described below.

As shown in FIG. 6, the mapping step 350 of the preferred embodiment of the method 300 maps the FF Object 246 from the FF Directory 240 into the Server Directory 260 by two alternative mapping options or steps that structure the OPC Item References. For both mapping options, the OPC Item ID and Path (not shown on figure) are automatically generated. The FF Object mapping options or steps are:

Mapping Option 1, mapping the FF Object 246 to OPC Item 266*a* with a tree structure of branches and leaf nodes accessed by the OPC Browse and Read service. OPC Item 266*a* includes the runtime Object Value of FF Object 246 mapped to the OPC Item Value, and FF Object 246 DD and CF semantic information mapped to OPC Item reference structures formatted to OPC Specifications. Accordingly, the semantic information for each FF Object 246 is represented by sub items. Each of their components may be represented as their sub items in the tree; and Mapping Option 2, mapping the FF Object 246 to single structured OPC Item 266b where the runtime Object Value of FF Object 246 is mapped to the OPC Item Value accessed by the OPC Value Read Service, and the DD/CF semantic information is mapped to OPC Item Properties accessed by the OPC Get Property service.

Referring to FIGS. 2 and 3A, and FIGS. 4–6, it is apparent to anyone skilled in the art that an alternate embodiment of IFDSA 50 and method 300 is to eliminate the FF Directory 240 and modify step 340 to directly map AP Directories and FF Objects from Fieldbus Devices 280 in Server Directory 261. It also apparent to anyone skilled in the art that the Object DD and Object CF in FF Object 240 does not need to be read from Fieldbus Devices 280 if a local copy of the DD/CF files are available (e.g., hard disk or CD-ROM) and that an alternate embodiment includes reading the Object DD and Object CF from such a local copy.

IV. IFDSA Single Client Application Software Interface

Figure 7:
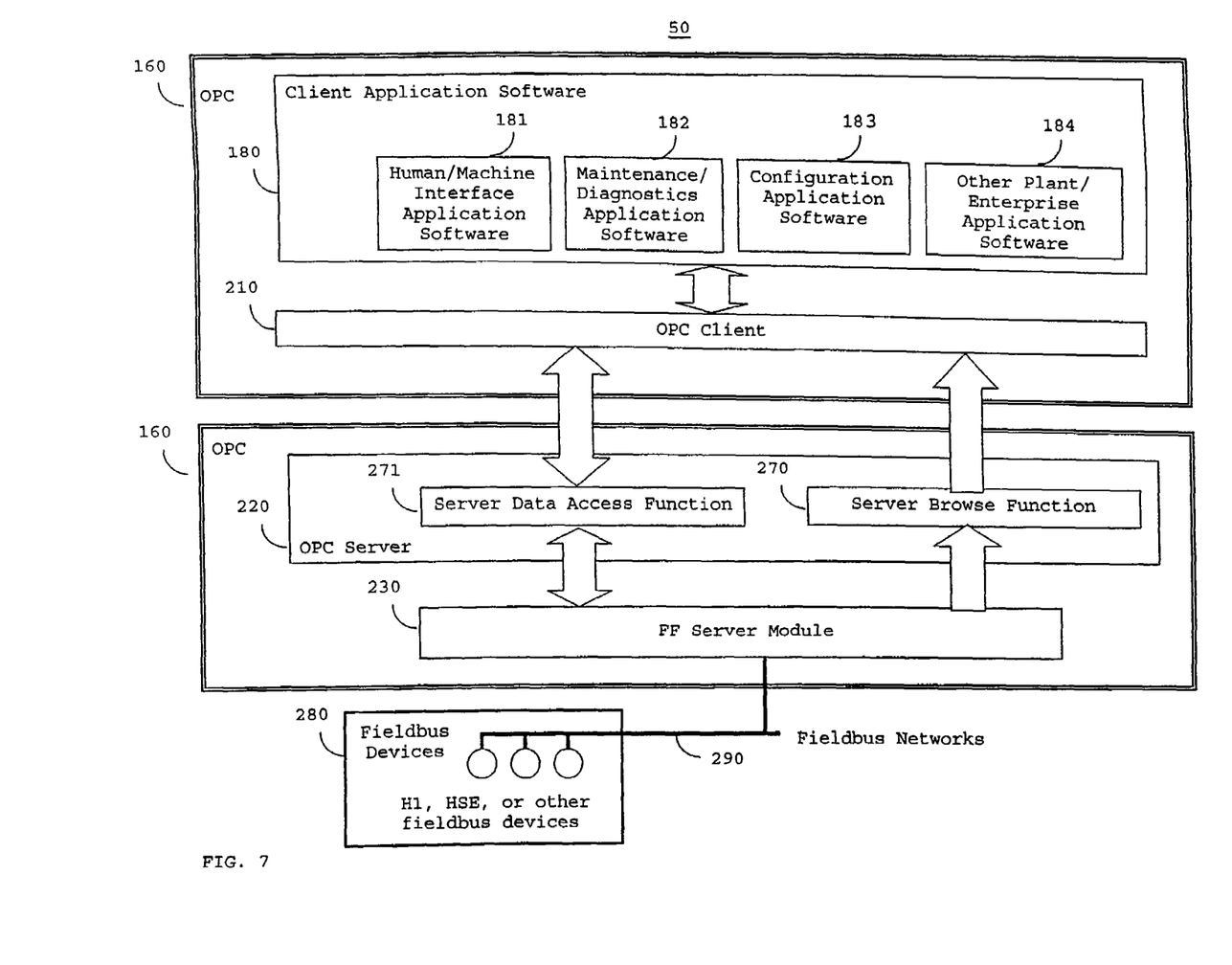
FIG. 7 is a diagram illustrating an exemplary method of Client Application Software accessing mapped FF semantic information using the Server Browse Function, and accessing runtime data, corresponding to the semantic information, using the Server Data Access Function, in an OPC server in an exemplary server directory of an exemplary embodiment of an integrated fieldbus data server architecture in accordance with the principles of the present invention.

Referring now to FIG. 7, a preferred embodiment of the IFDSA 50 provides a single interface for Client Application Software 180 access to Fieldbus Devices 280 runtime data and semantic information through OPC Client 210. The location of the H1, HSE and other control device semantic information in Server Directory is provided through the Server Browse Function 270 in OPC Server 220. FF Server Module 230 supports the Server Browse Function 270 in OPC Server 220 as described in Sections I–III above. The Fieldbus Devices 280 runtime data can be provided to Client Application Software 180 though the same OPC Client 210 interface as the semantic information.

OPC Client 210 can obtain the runtime value data from the Server Data Access Function 271 in OPC Server 220. FF Server Module 230 accesses Fieldbus Devices 280 runtime value data using protocol services defined in the FF Specifications in Appendix I and available from the Fieldbus Foundation. The mapping of Fieldbus Devices 280 runtime value data accessed by FF Server Module 230 to the Server Data Access Function 271 is defined by OPC Specifications available from the OPC Foundation.

A preferred embodiment of the new IFDSA 50 supports migration of existing application software, which is included in Other Plant/Enterprise Application Software 184 because existing application software only uses Server Data Access Function 271 and this function is unchanged by IFDSA 50. This invention includes the migration and coexistence of existing application software with new Client Application Software 180 in the IFDSA 50.

APPENDIX I

| FF Document Number | Title |
| --- | --- |
| FF-103 | Common File Format |
| FF-586 | High Speed Ethernet Presence |
| FF-588 | High Speed Ethernet Field Device Access (FDA) Agent |
| FF-589 | High Speed Ethernet System Management |
| FF-593 | High Speed Ethernet Redundancy |
| FF-801 | Network Management |
| FF-803 | High Speed Ethernet Network Management |
| FF-804 | Multivariable Optimization Addendum |
| FF-806 | Data Link Protocol Specification Bridge Operation Addendum |
| FF-821 | Data Link Services Subset |
| FF-822 | Data Link Protocol |

APPENDIX I-continued

| FF Document Number | Title |
| --- | --- |
| FF-870 | Fieldbus Message Specification |
| FF-875 | Fieldbus Access Sublayer |
| FF-880 | System Management |
| FF-890 | Function Block Application Process Part 1 |
| FF-891 | Function Block Application Process Part 2 |
| FF-892 | Function Block Application Process Part 3 |
| FF-893 | Function Block Application Process Part 4 |
| FF-894 | Function Block Application Process Part 5 |
| FF-940 | Communication Profile |
| FF-900 | Device Description Language |
| FF-941 | High Speed Ethernet Profile |

What is claimed is:

1. A method of dynamically creating a server directory to enable automatic access in an integrated control system, comprising the steps of:
   (a) accessing a live list of fieldbus devices, wherein the live list represents active fieldbus devices in the integrated control system;
   (b) building/updating a browse tree structure, wherein the browse tree structure defines a branch and leaf node organization, naming for the fieldbus devices and data from the fieldbus devices;
   (c) copying Application Process ("AP") directories and Foundation Fieldbus ("FF") objects from active fieldbus devices into a FF directory so that the FF directory has object semantics corresponding to the active fieldbus devices; and
   (d) mapping the FF Directory into the server directory, wherein the object semantics in the FF directory are mapped into the server directory in a standardized format that is automatically accessible by client application software running on a server.

2. The method of claim 1, further comprising the step of: powering-up the integrated control system prior to executing the accessing step.

3. The method of claim 1, further comprising the step of:
   (e) determining if there is a change in the live list, wherein a change is indicated when an active fieldbus device is removed or added to the integrated control system.

4. The method of claim 3, further comprising the steps of: if there is a change determined in the live list, repeating steps (a)–(d); and
   if no change is determined in the live list, repeating step (e).

5. The method of claim 1, wherein the server is an OLE for Process Control ("OPC") server and the mapping step maps the object semantics to OPC objects.

6. The method of claim 5, wherein the mapping step maps, for each fieldbus device, an AP Directory and each FF object contained in the FF directory to OPC Items.

7. The method of claim 1, wherein the mapping step maps device identification data, such as Link/Segment ID, Node ID, Device ID, and PD Tag data for each fieldbus device from the FF directory into the server directory.

8. The method of claim 1, wherein the mapping step maps an AP Directory for each fieldbus device from the FF Directory into the server directory.

9. The method of claim 1, wherein the mapping step maps FF Objects from the FF Directory into the server directory.

10. The method of claim 1, wherein the building/updating step builds the browse tree structure with live list device identification information read from the fieldbus devices.

11. The method of claim 1, wherein the copying step includes the steps of:
　reading the AP directories and FF objects of the active fieldbus devices in the live list;
　placing data from the AP directories and FF objects in a buffer; and
　copying the data from the buffer to the FF Directory.

12. An integrated control system providing a single interface for client application software to semantic and run-time data for fieldbus devices, comprising:
　a plurality of active fieldbus devices;
　a fieldbus network, wherein the fieldbus network connects the active fieldbus devices; and
　a server application, in communication with and operatively connected to the active fieldbus devices via the fieldbus network, including:
　　a FF server module, wherein the FF server module communicates with the active fieldbus devices through the fieldbus network;
　　a server browse function, wherein the server browse function is used to locate semantic information for the active fieldbus devices; and
　　a server data access function, wherein the server data access function provides access to runtime and semantic information for the active fieldbus devices.

13. The integrated control system of claim 12, further comprising:
　a client application, in communication with and operatively connected to the server application, including:
　　client application software; and
　　a client, in communication with and operatively connected to the client application software and in communication with the server browse function and the server data access function, wherein the client application software accesses the semantic information and the runtime data through the client.

14. The integrated control system of claim 13, wherein the client application software includes one or more of the following: human/machine interface application software; maintenance/diagnostics application software; and configuration application software.

15. The integrated control system of claim 13, wherein the client application is an OPC client.

16. The integrated control system of claim 12, wherein the server application is an OPC server.

17. The integrated control system of claim 12, wherein the active fieldbus devices include one or more of the following types of devices: H1 devices; HSE devices; or other fieldbus devices.

18. The integrated control system of claim 12, wherein the FF server module includes:
　a FF directory, wherein the FF directory includes object semantics of the active fieldbus devices;
　a mapping function, wherein the mapping function maps object semantics in the FF directory into a server directory; and
　the server directory, wherein the server directory includes object semantics of the fieldbus devices from the FF directory mapped in a format compatible with the client application software and automatically accessible by the client application software through the client.

19. The integrated control system of claim 18, wherein the server directory includes:
　a browse tree structure, wherein the browse tree structure defines a branch and leaf node organization and naming for the fieldbus devices and their objects.

20. A method of client application software, in an integrated control system, accessing semantic and runtime data for fieldbus devices through a single interface, comprising the steps of:
　providing a server browse function, wherein the server browse function provides access to semantic data for the active fieldbus devices;
　providing a server data access function, wherein the server data access function provides access to runtime data for the active fieldbus devices;
　providing a client in communication with the server browse function and the server data access function; and
　the client application software accessing the semantic data and the run-time data through the client.

* * * * *